United States Patent [19]

Evans

[11] Patent Number: 4,664,271
[45] Date of Patent: May 12, 1987

[54] STACKER-RECLAIMER INCLUDING COUNTERBALANCE WEIGHT

[75] Inventor: David A. Evans, Bristol, England
[73] Assignee: DRG (UK) Limited, Bristol, England
[21] Appl. No.: 721,657
[22] Filed: Apr. 10, 1985
[30] Foreign Application Priority Data Apr. 12, 1984 [GB] United Kingdom ............... 8409556

[51] Int. Cl.$^4$ ............................................. B66C 23/76
[52] U.S. Cl. ..................................... 212/196; 212/232
[58] Field of Search .............................. 212/195–198, 212/223, 232, 237, 255, 260

[56] References Cited

U.S. PATENT DOCUMENTS

| 849,078 | 4/1907 | Moss | 212/196 |
|---|---|---|---|
| 2,408,500 | 10/1946 | West | 212/196 |
| 3,304,634 | 2/1967 | Becker | 212/196 |
| 3,530,999 | 9/1970 | Naruns | 212/197 |
| 3,653,486 | 4/1972 | McLean et al. | 212/196 |
| 4,004,696 | 1/1977 | Briggs | 212/196 |
| 4,407,419 | 10/1983 | Clements | 212/189 |

Primary Examiner—Joseph F. Peters, Jr.
Assistant Examiner—Stephen P. Avila
Attorney, Agent, or Firm—Cushman, Darby & Cushman

[57] ABSTRACT

A stacker-reclaimer with a luffing and slewing mounting supporting a boom structure with a main, forwardly extending boom having a material conveyor running along it, and a rearwardly extending tail boom with a counterbalance weight depending from its rear end. The tail boom is at a higher level than the main boom to provide clearance for a feeder conveyor to the a material conveyor. The counterbalance weight is attached by a pivot on the tail boom and is displaceable about the pivot by a control cable attached to a non-luffing part of the luffing and slewing mounting forwards of the luffing axis whereby the weight is displaced forwards in relation to the pivot in upward luffing movements of the boom structure. This compensates for the rearward displacement of the rear end of the tail boom in such movements, and reduces the maximum overturning moment to be resisted in the working luffing range.

7 Claims, 3 Drawing Figures

STACKER-RECLAIMER INCLUDING COUNTERBALANCE WEIGHT

BACKGROUND OF THE INVENTION

This invention relates to stacker-reclaimers for depositing bulk material on a stockpile and reclaiming material from the pile.

Stacker-reclaimers are known comprising a forward or main boom that forms part of a boom structure on a luffing and slewing mounting. A conveyor extending along the boom conveys material to be stacked to the front end of the boom to deposit it on a stockpile. To reclaim the material from the stockpile a bucket-wheel or other material-gathering device is mounted at the front end of the boom and collects the material to deposit it on the conveyor, which is then running in the reverse direction. To at least partially counterbalance the weight of the boom and its associated equipment, the boom structure has a shorter tail boom which extends in the opposite direction from the mounting and carries a counterbalance weight at its rear extremity. In this way, the overturning moment on the mounting of the boom structure is reduced and the mounting can be constructed in a simpler and more economical manner.

In order to accommodate an elevating conveyor that delivers the material to the inner end of the main boom, when the stacker-reclaimer is working in the stacking mode, the tail boom must be considerably higher than the main boom and as a result there are variations in the effectiveness of the counterbalance weight when the boom structure is luffed. This arises because, whereas the axis of the main boom extends to the mounting at more or less at the same level as the luffing pivot, so that any point on the boom is displaced vertically or nearly vertically during luffing, the higher position of the tail boom results in the counterbalance weight having a significant horizontal component of displacement in the same luffing movement. The moment produced by the weight about the luffing pivot will then change and to cope with the possible variation the mounting of the boom structure must be capable of resisting a substantially greater resultant moment tending to overturn the boom structure. A more robust mounting construction is therefore demanded and that requirement may even limit the maximum capacity of the stacker-reclaimer.

SUMMARY OF THE INVENTION

According to the present invention, there is provided a stacker-reclaimer having a boom structure supported on a luffing and slewing mounting, said structure comprising a main forwardly extending boom with conveying means for the material along its length and with material retrieval means at its forward end, and a rearwardly extending tail boom with a counterbalance weight remote from the mounting, the tail boom being disposed at a higher position then the main boom to provide clearance for elevating means feeding said boom conveying means, said weight depending below the tail boom from a pivot on said boom to be displaceable towards and away from a pivot axis of the mounting, and control means being provided for said displacement whereby the weight is displaced forwardly in relation to its pivot when the main boom is raised above a horizontal position.

Conveniently, the weight is controlled by a tension element influenced by the luffing movements, said element being attached to the weight to hold the weight forwards of its pivot in all working attitudes of the boom structure, whereby the tension element will be maintained continuously in tension and have a controlling influence throughout the working range.

Thus, the tension element can be attached at one end to the weight and at the other end to an anchorage on a member of the luffing and slewing mounting that does not participate in the luffing and slewing movement. In a preferred configuration, the tension element is led upwards and forwards from its anchorage, over a guide on an intermediate mast of the boom structure, and extends rearwards from that guide to the weight.

BRIEF DESCRIPTION OF THE DRAWINGS

An example of a stacker-reclaimer according to the invention is illustrated schematically in the accompanying drawings, in which the machine is shown in FIGS. 1-3 with the main boom in horizontal, raised and lowered positions respectively.

DESCRIPTION OF THE PREFERRED EMBODIMENT

Figure 1:
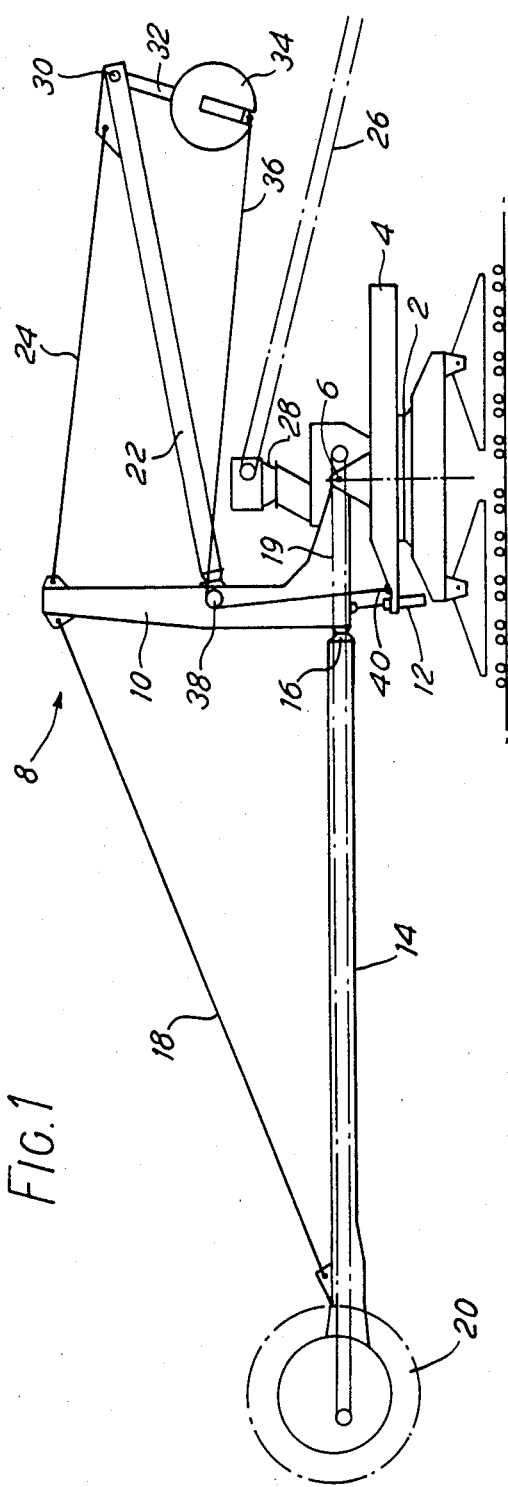

The stacker-reclaimer comprises a carriage of entirely conventional form on which, in known manner, there is a luffing and slewing mounting comprising a slew mounting ring 2, a platform 4 rotatable about the vertical pivot axis of the slew ring 2 and a luffing pivot 6 with an axis intersecting the slew pivot axis. A boom structure 8 comprises a mast 10 which is mounted on the platform through the pivot 6 and a luffing drive hydraulic cylinder 12 forwards of the pivot.

Extending forwards from the mast the boom structure includes a main boom 14 supported in a fixed position relative to the mast by a pin connection 16 at its inner end and cables 18 between its outer end and the top of the mast. In conventional manner a belt conveyor 19 runs along the length of the boom and a bucket wheel 20 is rotatably mounted at the forward extremity of the boom.

Approximately midway in height between the attachment of the main boom and its cables an auxiliary tail boom 22 is attached to the mast and is also supported by cables 24 running from the top of the mast to its outer end. The tail boom is disposed thus, considerably higher than the main boom, in order to accommodate below it a conventional elevating conveyor 26 feeding the main boom conveyor through a hopper chute 28 when the machine is working in the stacking mode.

From a pivot 30 at its rear extremity the tail boom has a rigid arm 32 suspended, and a counterbalance weight 34 is fixed to the lower end of the arm. A cable 36 attached one end to the weight runs in a direction substantially parallel to the main boom over a pulley 38 on the mast at the level of the tail boom attachment and has its other end attached to an anchorage 40 on the platform 4 forwards of the luffing pivot 6.

When the luffing cylinder 12 is extended to raise the main boom (FIG. 2) the distance between the anchorage 40 and the guide pulley 38 increases so that the cable 36 pulls the counterbalance weight 34 further from the vertical through the pivot 30 and conversely when the main boom is lowered (FIG. 3) that distance decreases and the weight 34 moves closer to the vertical. It is arranged that the weight always remains inclined towards the mast to some extent, even in the fully lowered position of the main boom, so as to ensure the cable remains in tension.

Figure 2:
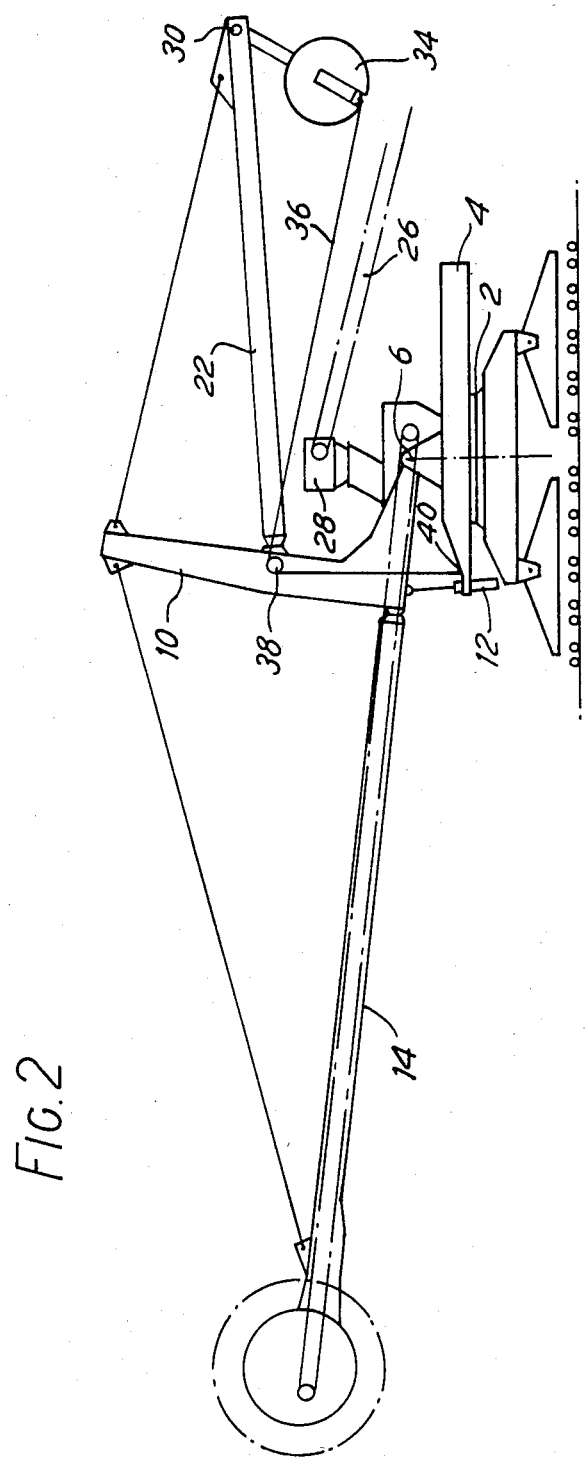
Figure 3:
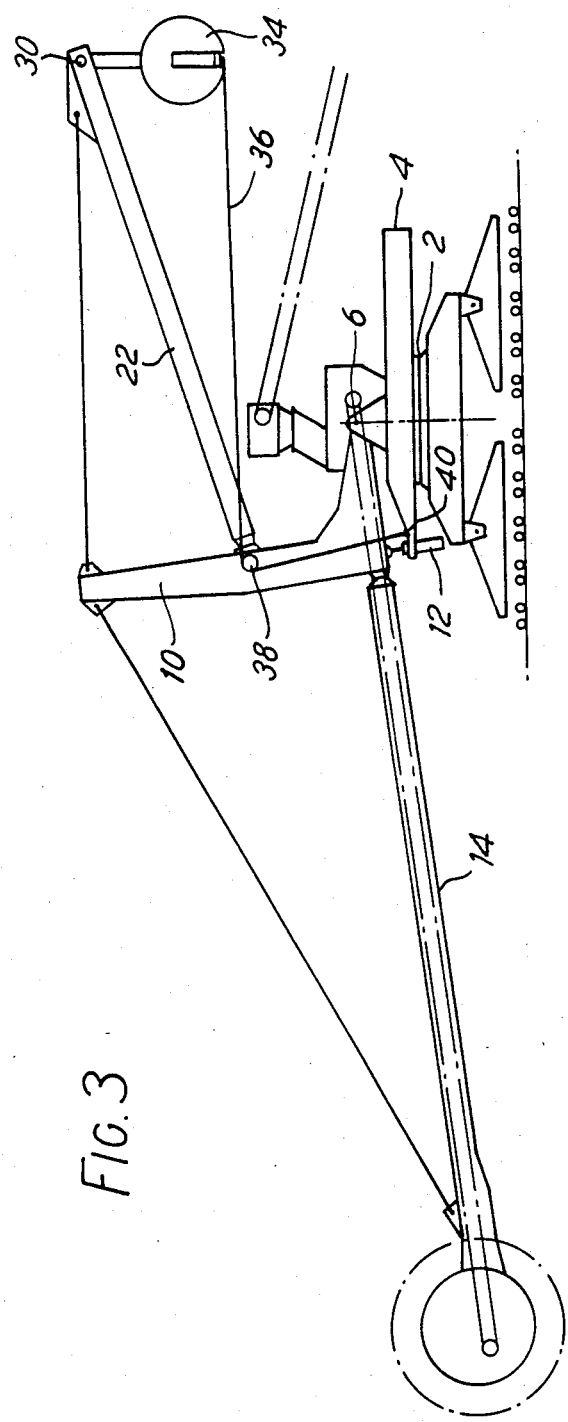

It will be noted that very minor changes occur in the horizontal distance between any point on the main boom and the slewing axis as the boom structure moves between the positions illustrated in FIGS. 2 and 3 whereas the distance of the rear extremity of the tail boom from the slewing axis varies considerably because the line joining the rear of the boom to the luffing centre is at a large angle to the horizontal. The resultant displacement of the counterbalance weight which is compounded from the movement of its pivot 30 and the displacement relative to the boom structure that is imposed by the cable 36, is able to reduce significantly changes of the moment of the weight about the luffing pivot.

It could be arranged that during luffing there are changes in the moment of the weight 34 about the luffing pivot corresponding exactly to changes in the moment due to the gravity forces on the main boom with the equipment mounted on it, so that any overturning moment on the slewing ring is kept constant. However, another result of the luffing movement is that the tension in the cable 36 will vary with displacement of the counterbalance weight from the vertical. The luffing cylinder not only opposes the moment of the gravity loads acting about the luffing pivot axis but also opposes the cable tension, of course. If therefore it is attempted to keep constant the overturning moment on the slewing ring, the luffing cylinder will experience greater variations of load to oppose the resulting variations in the cable tension. In general it is thus preferable to design for some variation of the moment of the weight 36 about the luffing pivot and so reduce the variation in cable tension. In this way, although luffing displacements of the boom structure and counterbalance weight will still produce varying loading on the slewing ring, both the luffing cylinder and the slewing ring can be subjected to smaller variations than they would experience if no counterbalance weight were provided and their maximum design loading can be reduced.

In practice, the balance of forces is in any case preferably so arranged that the luffing cylinder is subject to some compression force at all times, as a fail-safe measure.

It will be understood that many modifications of the illustrated construction are possible within the scope of the invention. For example, although a very simple and effective means of controlling the counterbalance weight position is provided by the use of a tension cable attached to a non-luffing part of the luffing and slewing mounting, it is possible to use other control means including rigid displacement-transmission devices and active, powered control devices.

We claim:

1. A stacker-reclaimer comprising a luffing and slewing mounting having respective means defining a luffing pivot axis and a slewing pivot axis, a boom structure supported on said mounting for slewing movement around said axis, said structure including a mast, a main boom extending forwardly of said mounting, and a tail boom extending from said mast above said main boom and rearwardly of said mounting, luffing drive means for raising and lowering said mast and booms, material retrieval means at the forward end of the main boom, material conveying means along the main boom for conveying material fowards along said boom and for conveying material deposited by said retrieval means along said boom, the tail boom being disposed at a higher position than the main boom to provide clearance for elevating means feeding said boom material conveying means, a pivot mounting on said tail boom, a counterbalance weight, means for depending said weight from said mounting below the tail boom at a fixed radius therefrom and at a distance radially of the luffing and slewing mounting, said counterbalance weight being displaceable below said tail towards and away from the slewing pivot axis of said mounting, and control means connected to said weight for said displacement whereby the weight is displaced forwardly in relation to its pivot when the main boom is luffed to raise said main boom to compensate for different horizontal movements of said booms.

2. A stacker-reclaimer according to claim 1 wherein the counterbalance weight is so arranged that at the luffing pivot axis a moment is maintained urging the main boom downwards, and luffing drive means for raising the boom structure set in opposition to said downward movement.

3. A stacker-reclaimer comprising a luffing and slewing mounting having respective means defining a luffing pivot axis and a slewing pivot axis, a boom structure supported on said mounting for slewing movement around said axis, said structure including a mast, a main boom extending forwardly of said mounting, and a tail boom extending from said mast above said main boom and rearwardly of said mounting, luffing drive means for raising and lowering said mast and booms, material retrieval means at the forward end of the main boom, material conveying means along the main boom for conveying material forwards along said boom and for conveying material deposited by said retrieval means along said boom, the tail boom being disposed at a higher position than the main boom to provide clearance for elevating means feeding said boom material conveying means, a pivot mounting on said tail boom, a counterbalance weight depending from said mounting below the tail boom and at a distance radially of the luffing and slewing mounting, said counterbalance weight being displaceable below said boom towards and away from the slewing pivot axis of said mounting, and control means connected to said weight for said displacement whereby the weight is displaced forwardly in relation to its pivot when the main boom is luffed to compensate for different horizontal movements of said booms including a tension element attached to the weight, to hold the weight forwards of its pivot whereby said element is maintained in tension.

4. A stacker-reclaimer according to claim 3 wherein the luffing and slewing mounting defines a luffing center and comprises a portion that does not participate in the luffing motion and an anchorage for said tension element is provided on said portion, said element extending from said anchorage to said weight forward of the luffing center.

5. A stacker-reclaimer according to claim 4 wherein a guide is provided on the boom structure upwards and forwards from the anchorage and the tension element extends over said guide and rearwards from said guide to the weight.

6. A stacker-reclaimer according to claim 3 wherein the tension element extends forwards from the weight substantially parallel to the main boom.

7. A stacker-reclaimer comprising:
   a luffing and slewing mounting having respective means defining a luffing pivot axis and a slewing pivot axis, said mounting including a base portion that does not participate in the luffing motion, a boom structure supported on said mounting for luffing and slewing thereon, said structure including a mast, a main boom extending from said mast forwardly of said mounting, a tail boom extending from said mast above said main boom rearward of said mounting and luffing drive means for raising and lowering said mast and booms, material retrieval means at the forward end of the main boom, material conveying means along the main boom for conveying material forwards along said boom and for conveying material deposited by said retrieval means rearwards along said boom, the tail boom being disposed at a higher position than the main boom to provide clearance for elevating means feeding said boom material conveying means, a pivot mounting on said tail boom, a counterbalance weight depending from said mounting below the tail boom and at a distance radially of the luffing and slewing mounting, said counterbalance weight being displaceable below said boom towards and away from the slewing pivot axis of said mounting, a tension element connected to said weight for said displacement of the weight, an anchorage for the said tension element on said base portion of the pivot mounting, the weight being thereby connected to said base portion through the tension element so that the weight is displaced forwardly in relation to its pivot when the main boom is luffed to raise said main boom to compensate for different horizontal movements of said booms.

* * * * *